July 8, 1958  C. W. BELDEN ET AL  2,841,966

FLEXIBLE COUPLINGS

Original Filed Oct. 30, 1950　　　　　5 Sheets-Sheet 1

INVENTORS
Harley E. Northrop
and
BY Charles W. Belden
Harry R. Canfield
ATTORNEY.

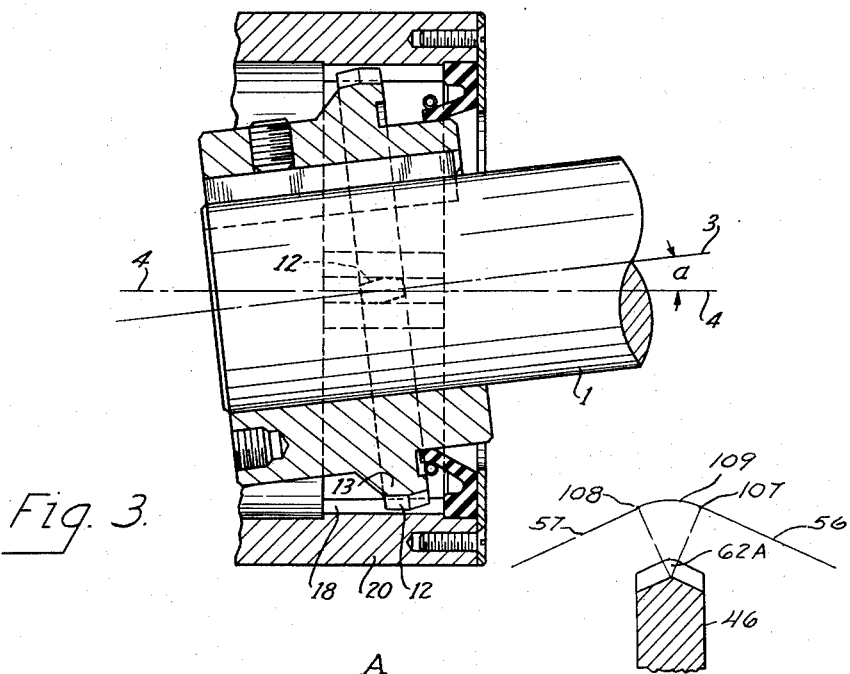
Fig. 3.
Fig. 24.
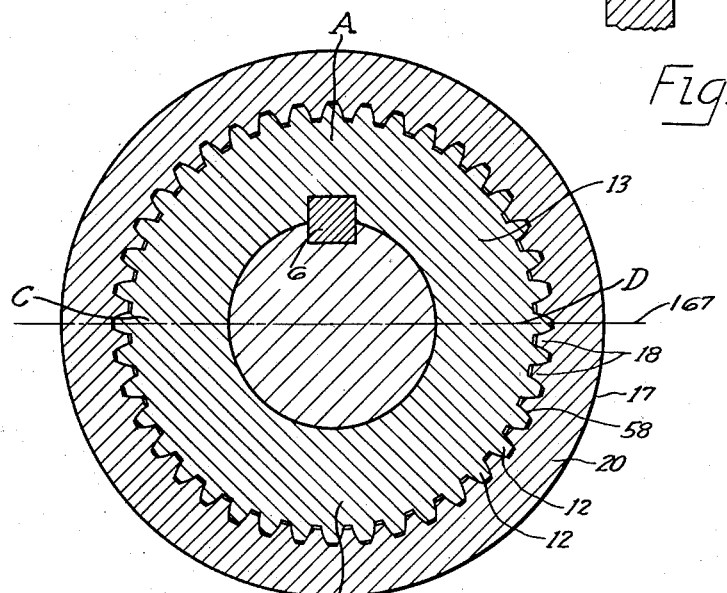
Fig. 9.
INVENTORS
Harley E. Northrop
and
BY Charles W. Belden
Harry P. Canfield
ATTORNEY.

July 8, 1958 — C. W. BELDEN ET AL — 2,841,966
FLEXIBLE COUPLINGS
Original Filed Oct. 30, 1950 — 5 Sheets-Sheet 3

INVENTORS
Harley E. Northrop
and
BY Charles W. Belden
Harry P. Canfield
ATTORNEY.

INVENTOR.
Harley E. Northrop
and
BY Charles W. Belden

Harry R. Canfield
ATTORNEY

July 8, 1958   C. W. BELDEN ET AL   2,841,966
FLEXIBLE COUPLINGS

Original Filed Oct. 30, 1950   5 Sheets-Sheet 5

INVENTORS
Harley E. Northrop
and
BY Charles W. Belden

Harry P. Canfield
ATTORNEY.

# United States Patent Office 2,841,966
Patented July 8, 1958

2,841,966

FLEXIBLE COUPLINGS

Charles W. Belden and Harley E. Northrop, Westfield, N. Y.

Continuation of application Serial No. 192,954, October 30, 1950. This application November 14, 1955, Serial No. 546,744

11 Claims. (Cl. 64—9)

This invention relates to couplings of the class for coupling together rotary shafts that are out of axial alignment, and commonly known as flexible couplings.

There is a known type of flexible coupling which comprises in general, two parts having the general form of spur gears, each mounted on one of the shafts, and a third common part in the general form of an outer ring gear, the teeth of each spur gear being meshed with internal teeth on the ring gear; and the present invention is an improved coupling of this type.

Such couplings are usually referred to as "gear type" couplings; because the teeth on the said parts may be conveniently formed by gear-tooth cutting machinery, and because the parts considered alone resemble toothed gears. In fact, however, the characteristic action of gears, that is, a pitch circle of one rolling on a pitch circle of the other, is entirely absent in the coupling; all of the teeth and tooth spaces of the said outer toothed part of the coupling being at all times intermeshed with all of the teeth and tooth spaces of the said two inner parts in the nature of spline connections.

Axial misalignment of the shafts to be coupled will be present when their axes are at an angle to each other; or when they are parallel but offset laterally, one from the other; or, when they are at an angle and also offset.

When two shafts, in axial misalignment of either of said types, are coupled by such a coupling the medial plane of the inner gear (or gears) is at an angle to the medial plane of the outer gear (as will be shown hereinafter), that is, the inner gear is tipped angularly within the outer gear, and in the absence of special provisions the teeth of the inner gear will bind in the teeth of the outer gear.

This would present no difficult problem if the angle of shaft misalignment could be selected or predetermined and be always the same; because it could be solved simply by providing sufficient clearance between the teeth of the two meshed gears. But the coupling to be practicable and commercial must be adapted to couple shafts of different misalignment angles in different installations; and in fact the actual angle is almost always unknown. An angle of misalignment greater than 3° is visibly apparent, and can usually be partially corrected or reduced, so that in general a coupling will have sufficient range of adaptability if it can couple shafts at all angles from 0° to 3°.

In toothed gear practice generally, it is desirable to provide a small clearance between the meshed teeth; and such clearance is also desirable between the teeth in a gear type coupling. The small amount of lost motion introduced by such clearance is harmless and negligible.

However, in a gear type coupling, if the teeth are given enough clearance to allow the inner gear to be tipped enough, as aforesaid, to couple shafts at an angle of misalignment as great as 3°, then, when used to couple shafts at a lesser angle of misalignment, with the inner gear tipped a lesser amount, and in the absence of countervailing provisions, the lost motion is thereby made so great as to be properly described as "back-lash"; that is, an amount of lost motion that permits the teeth to vibrate back and forth in the tooth spaces accompanied by discontinuous or intermittent transmission or torque through them which is not only objectionable in a coupling but in many cases is damaging to the coupling or to apparatus driven by it.

It has been proposed to give the teeth a special form to permit said tipping of the gear; but in all prior couplings, if the special form of teeth permits the gear to tip as aforesaid and without back-lash for one degree of misalignment and tipping, it will cause binding or introduce back-lash at other degrees. So far as is now known, no form of tooth has heretofore been devised which will obviate these defects.

Perhaps the most completely developed prior coupling of this type is one in which the inner gears are "spherical gears," that is, have teeth cut with respect to a spherical pitch surface; but as will appear hereinafter, a spherical gear does not solve the double problem of no binding and no back-lash.

The objects of the invention are:

To provide generally an improved coupling of the type referred to, by which shafts at any angle of misalignment from 0° to 3° or higher if wanted, can be coupled and driven without binding and without back-lash in the coupling.

To provide for a coupling of the type referred to, an improved shape of tooth at the aforesaid spline connection of the parts by which back-lash or binding as referred to, may be obviated.

Other objects will become apparent to those skilled in the art to which the invention appertains.

The actual invention is that set forth in the appended claims.

The preferred embodiment of the invention fully described herein is a coupling of the type referred to, and comprising an outer ring gear with internal teeth preferably parallel to its axis; and an inner gear the teeth of which, on the opposite sides of a medial plane of the gear, converge rectilinearly toward the gear axis and rise from opposite cone surfaces whose bases are in the medial plane and whose apexes are in or near the gear axis.

The teeth of the inner gear are preferably cut from a blank by a gear cutting hob, with generating relative motion of the hob and blank, which makes the faces of the teeth generally of involute form, although the involute shape of the faces is incidental and not essential.

The teeth, may be considered as having a chosen pressure angle, as in the case of ordinary gears as such.

The maximum angular displacement of the shafts to be coupled which may be encountered in practice may also be chosen.

The pitch diameter of the gear may also be chosen, as represented by a circle on the teeth at their middle between root and tip.

Given the maximum angle of misalignment and the pressure angle and the pitch diameter, the cone angle and other factors may be determined from a formula to be described by which a coupling can be made that will have no back-lash or binding at all shaft misalignment angles from zero to the chosen maximum angle.

As will be referred to a maximum shaft misalignment angle of 3° will suffice for most installations but as will be found hereinafter, misalignment angles up to or even greater than 6° are possible with the invention without back-lash or binding.

The invention is fully disclosed in the following description taken in connection with the accompanying drawings, in which:

Fig. 3 is a fragmentary view similar to a part of Fig. 1 illustrating parts as they appear when one of the shafts is at an angle of misalignment with respect to the other;

Fig. 9 is a cross sectional view from the plane 9—9 of Fig. 1;

Figure 1:
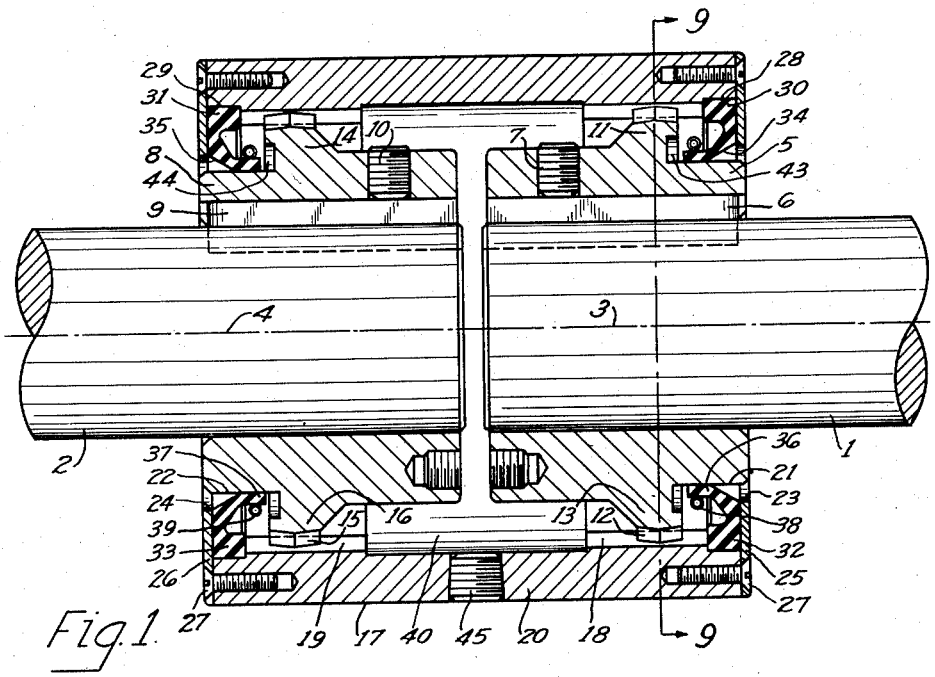
Fig. 1 is a longitudinal sectional view of a coupling embodying the invention in one form and showing two shafts coupled together without misalignment for simplification.
Figure 2:
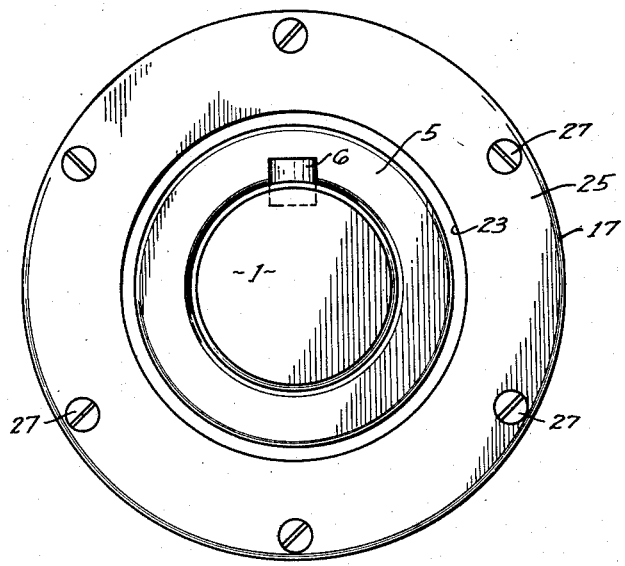
Fig. 2 is an end elevational view of the coupling of Fig. 1.
Figure 6:
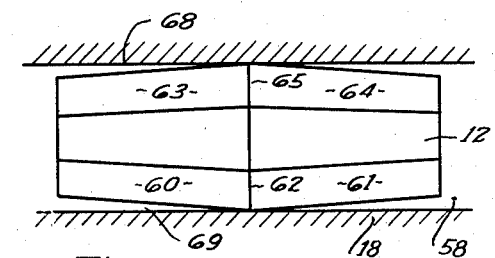
Fig. 6 is a view illustrating the teeth of Fig. 5 as viewed from above.

Referring to Fig. 1, there is shown at 1 and 2, two shafts coupled together by a flexible coupling embodying the invention. For simplification, the shafts are shown with their axes 3—4 in alignment. A coupling hub member 5 is mounted on the end of the shaft 1 by a key 6 and set screw 7. A hub member 8 is mounted on the shaft 2 by a key 9 and set screw 10, the two hub members being preferably alike and mounted reversely on the shafts.

On the hub member 5 is an annular rib 11 on the pheriphery of which are gear teeth 12 to be described, the rib constituting what may be referred to as a disc-like gear body and the rib and teeth as an inner gear 13. The hub member 8 has a like rib 14 and teeth 15 constituting an inner gear 16.

Surrounding the inner gears 13 and 16 is a tubular sleeve 17 on the inner wall of which are formed at one end portion elongated teeth 18 meshed with the inner gear teeth 12 and at the other end portion, elongated teeth 19 meshed with the inner gear teeth 15; and the sleeve 17 and its teeth 18 and 19 may be referred to as an outer gear 20.

The teeth 12—15 of the inner gears 13 and 16 fit the tooth spaces of the outer gear 20 in such manner that the outer gear is supported thereon, see Fig. 9.

At the opposite ends of the hubs 5 and 8 they have cylindrical surfaces 21 and 22. Surrounding these surfaces but spaced radially therefrom as at 23—24 are annular end plates 25 and 26 mounted on the ends of the sleeve 17 by screws 27—27.

The teeth 18—19 of the outer gear 20 terminate short of the ends of the sleeve 17 leaving annular grooves 28—29 between the plates 25—26 and the teeth 18—19.

Annular seals 30—31 of rubber preferably of a kind resistant to chemical action of oil, for example "Neoprene," are provided between the said cylindrical surfaces 21—22 of the hubs and the sleeve 17. They comprise outer annular beads 32—33 bottoming in the said grooves 28—29, and clamped between the rings 25—26 and the ends of the teeth 18—19 and thereby effecting seal with the sleeve 17.

The seals have annular flexible skirts 34—35 inclined inwardly radially and inwardly axially, terminating in annular beads 36—37 encircling the hub surfaces 21—22. Coiled springs 38—39 of the annular garter spring type encircle the beads 36—37 and constrictingly hold them upon the surfaces 21—22 to effect seal thereat.

A sealed chamber 40 is thus provided in which a quantity of lubricating oil is entrapped and sealed and thrown outwardly into an annular body of oil on the inner side of the sleeve 17 by rotation of the parts in use, flooding and lubricating the meshed teeth.

The flexibility of the seal skirts 34—35 permits angular misalignment of the shafts 1—2 and tipping of the hubs 5—8 (to be referred to) while maintaining the seal.

The axially inner ends of the seal beads 36—37 are spaced from the ribs 11—14 providing opposite annular pockets 43—44 in the ribs, allowing freedom of the outer gear 20 to float and shift axially relative to the inner gears 13—16 without contacting the beads 36—37 and the extent of the shifting is limited or stopped in either direction by abutting contact of the teeth 12 and 15 with the outer beads 32—33.

Oil may be introduced into the chamber 40 after assembly of the coupling with the shafts, through a screw plug 45 in the wall of the sleeve 17.

In operation, the shaft 1 when rotating drives the inner gear 13; its teeth 12 meshed with the teeth 18 of the outer gear 20 drive the latter; the teeth 19 of the outer gear meshed with the teeth 15 of the inner gear 16 drive the latter; the inner gear 16 drives the shaft 2. The parts are shown in Fig. 1 with the shafts 1 and 2 in axial alignment.

In Fig. 3, the shaft 1 is shown with its axis 3 at an angle of misalignment, a, with respect to the axis of the shaft 2 (not shown) and the inner gear 13 is shown at the corresponding tipped angle with respect to the outer gear 20 as the parts would be in practice in an illustrative case; and the following description explains the coupled drive and its property of driving without back-lash or binding at all such angles of misalignment.

Figure 4:
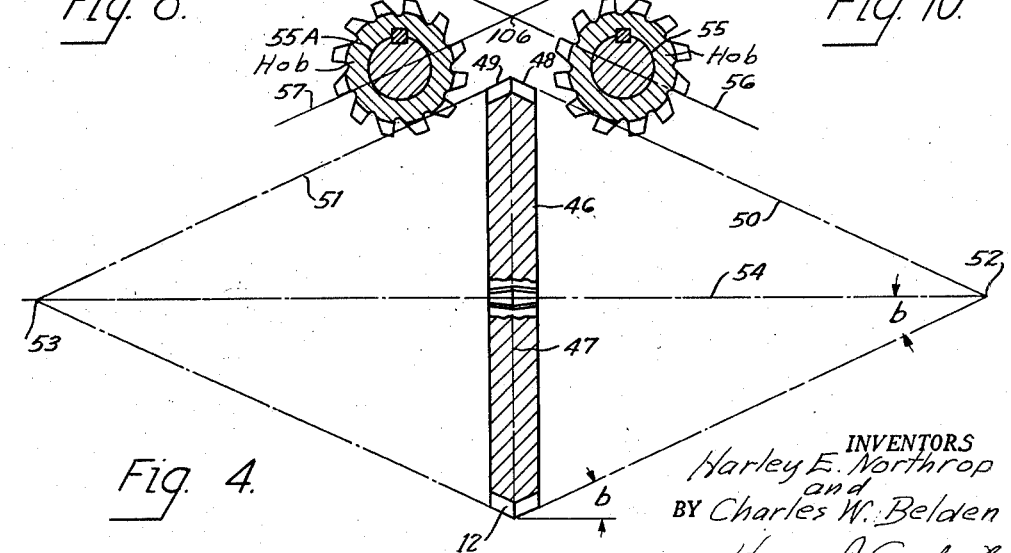
Fig. 4 is a diagrammatic view illustrating methods of cutting teeth on an inner gear element of Figs. 1 to 3.

The teeth on the inner gears, for example the teeth 12 on the inner gear 13 are cut from a solid blank as illustrated diagrammatically in Fig. 4.

A circular blank 46 is shown with its periphery bevelled in opposite directions from its medial plane 47, as at 48—49, so that the surfaces 48—49 lie on opposite cones 50—51, having the medial plane 47 as their common base, and having their apices 52—53 in the axis of the blank.

The angle, b, between the side of the cone and the axis 54 will hereinafter be referred to as the cone angle. A helical hob 55 is rotated and fed parallel to the side of the cone 50 along the line 56 cutting the blank from the right face as viewed in Fig. 4 to the medial plane of the blank, and then a hob 55A is fed parallel to the side of the cone 51 along the line 57 cutting the blank from the left face to the medial plane 47. Alternative methods will be referred to later.

The blank is concurrently rotated on its axis 54 at a siutable speed for the hob so that the hob cuts generated teeth with involute faces, in the same and well known manner as ordinary involute gear teeth are cut and generated on gears that are to be used as gears.

The teeth thus made will have the form shown in Figs. 5 to 8, where one of them 12 is shown to enlarged scale meshed with a tooth space 58 of the outer gear teeth 18.

Figure 7:
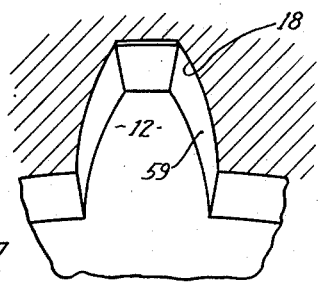
Fig. 7 is a view illustrating the teeth of Fig. 5 as viewed from the end.

The involute faces of the teeth 12 indicated at 59, Fig. 7, will taper from the root toward the tip and may be considered as having a pressure angle, as if they were to be used as ordinary rolling gear teeth, the pressure angle having been preselected by the shape or angle of the helical hob teeth.

Figure 5:
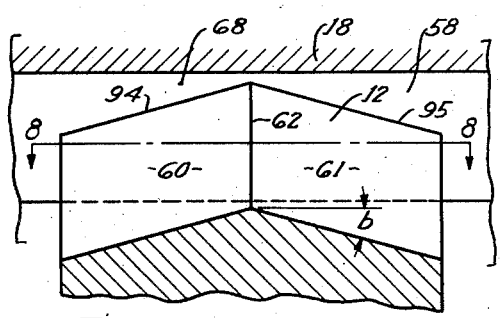
Fig. 5 is a fragmentary view to enlarged scale of an upper part of Fig. 1 illustrating meshed teeth on an outer and an inner gear element of Fig. 1.
Figure 8:
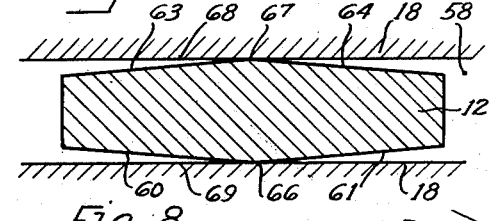
Fig. 8 is a cross sectional view of the teeth of Fig. 5 taken from the plane 8—8 of Fig. 5.

In Figs. 5 and 8, the tooth 12 of the inner gear 13 is shown in the condition of the parts of Fig. 1 without misalignment angle, and therefore with the gear not tipped as referred to, and, as seen, the tooth face (toward the observer in Fig. 5) is in two halves 60—61 meeting in a dihedral edge or corner 62 at the medial plane; and the opposite face (Fig. 6) likewise has two halves 63—64 meeting in a dihedral edge 65. As viewed in Fig. 5, all parts of the tooth slope rectilinearly from the medial plane toward the opposite ends of the tooth, at the cone angle b.

As will be evident, the bottoms of the tooth spaces will define a cone surface having the preselected cone angle b; and this is indicated by the angle b in Fig. 5.

The teeth 18 of the outer gear 20 are cut by the usual internal gear cutting method and preferably parallel to the axis, at a pressure angle such that the teeth 12 of the inner gear teeth at the dihedral angle edge 62—65 conform to and substantially fit the tooth spaces 58 of the outer gear teeth as shown in Fig. 9.

The faces of the tooth in the direction parallel to the gear axis and parallel to the teeth spaces 58 of the outer gear, are approximately rectilinear as shown in Fig. 8 for the section plane 8—8 of Fig. 5; and this illustrates one of the most important features of the invention to be more fully described; but here it is pointed out that as illustrated in Fig. 8, even if the tooth 12 fits the tooth space 58 so intimately that the points 66—67 on the said dihedral corners 62—65 of the tooth are in actual contact with the tooth faces 68—69 of the teeth 18, then because of the cone angle at which the teeth are formed, the faces 60, 61, 63, 64 of the teeth 12 all incline inwardly away from the tooth faces or sides 68—69 of the teeth of the outer gear in rectilinear directions, at both sides of the dihedral edge points 66—67.

Referring now to Fig. 9, in which the inner gear 13 is shown as in Fig. 1, without being tipped due to shaft misalignment, and with its teeth 12 meshed in the tooth spaces 58 between the teeth 18 of the outer gear 20, it is convenient to designate the top, bottom, and sides of the inner gear, as viewed, by the characters A, B, C and D.

In this un-tipped position of the inner gear 13, the teeth 12 at all four positions A to D, will be in the relation to the outer gear teeth spaces, as illustrated in Figs. 5 to 8. The teeth 12 can be made, as will be understood, by setting the hob 55, Fig. 4, at a suitable cutting depth, so that in Figs. 5 to 8, the dihedral edges 62 and 65 of the inner gear 13 will be in actual contact with the sides 68 and 69 of the teeth 18 of the outer gear, that is, without any clearance therebetween. All of the teeth 12 of the inner gear will mesh with and engage and drive the teeth 18 of the outer gear.

When the shafts are at a misalignment angle a, as referred to, the inner gear 13 is tipped within the outer gear 20 as in Fig. 3. In Fig. 9, the top A is then nearer to the observer, the bottom B farther away from the observer; and the parts C and D are rocked on a horizontal axis 167, rocking or twisting the inner teeth 12 on that axis.

Figure 10:
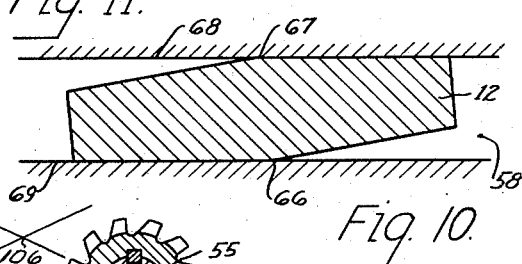

In Fig. 3, this rocked or twisted position of the tooth 12 at the position C is shown in dotted lines and as seen it lies diagonally in the tooth space 58 of the outer gear 20; and this twisted position is also shown more clearly in Fig. 10 which is drawn to correspond to the untwisted position of Fig. 8.

As the inner gear is thus tipped, the tooth 12 which is at the position C (or D) of Fig. 9 goes from the condition of Fig. 8 to that of Fig. 10.

Assuming that the tooth was in actual contact at points such as 66—67 of the dihedral edges 62—65 as shown in Fig. 8, it will nevertheless be free to twist to the position of Fig. 10, without binding. In going from Fig. 8 to Fig. 10, the point 67 may be considered as pivoting or moving in a circular arc around the point 66, and therefore as introducing a slight amount of clearance at the point 67.

The maximum angle through which the tooth 12 can twist in this manner can be made to be at least as great as the maximum angle of shaft misalignment to be encountered, and causing the twist, by providing a suitable cone angle as will be explained.

In Fig. 10, the tooth 12 is shown as twisted through the aforesaid angle a of Fig. 3.

Figure 11:
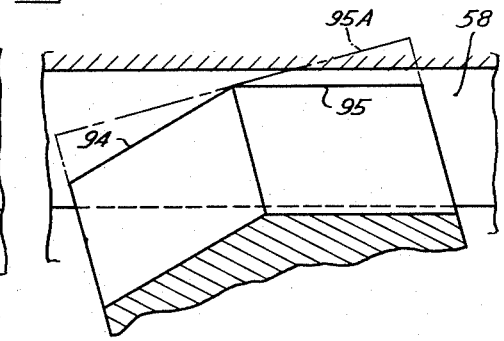
Figs. 10 and 11 are views similar to Figs. 8 and 5, but illustrating meshed teeth of the inner and outer gears when the inner gear is tipped with respect to the outer gear.

The foregoing total possible tipping of the gear 13 and twisting of tooth 12 at positions C and D, assumes that the gear 13 is free to tip without binding at any point. This will be true for the teeth 12 at positions A and B, Fig. 9, because their arcuate movement around the axis 167 upon tipping of the gear on that axis will be generally parallel to the tooth spaces 58 of the outer gear in which they are meshed, and they will take up positions such as shown in Fig. 11 for the position A.

This arcuate movement will have a component toward the axis 167 and the dihedral edges of the tooth will be withdrawn slightly, radially, out of the tooth spaces 58 and not be in actual contact at said positions A and B.

At positions of Fig. 9 between positions A and D (and similarly between positions D—B and B—C and C—A) tipping of the inner gear and rocking its teeth around the axis 167 gives the teeth a component of movement toward the observer in Fig. 9 and also a component vertically downward as viewed in Fig. 9 which latter tends to make the teeth 12 engage and bind on the outer gear teeth 18 and limit the said tipping angle (assuming that the inner and outer gear teeth were in actual contact at the dihedral edges 62 and 65 in the non-tipped position).

It can be demonstrated by trigonometry that the point between positions A and D for example, at which this binding tendency is greatest, depends upon the pressure angle chosen for the teeth, being nearer to the position D for larger pressure angles and farther away from D for smaller pressure angles approaching a position midway between A and D for zero pressure angle.

The teeth 12 will therefore be cut to provide relief to permit tipping of the inner gear through the maximum angle as aforesaid, and this is done by simply setting the hob to cut deeper.

A very slight amount of such relief cutting is needed for this purpose, less being required for teeth of large pressure angle than for teeth of small pressure angle.

After such relief cutting is provided, the teeth 12 will be at actual contact with the teeth 18 in said intermediate positions when the gear is fully tipped; but the teeth 12 will be thinner at the dihedral corners 62—65 in the medial plane, and this tends to introduce clearance thereat. When the inner gear therefore is in the non-tipped condition, this clearance will appear at points 66—67, Fig. 8, and at all of the teeth around the gear; and when the gear is in the fully tipped condition, clearance will appear at the points 66—67, Fig. 10.

But this clearance is still in all cases negligibly small, being less in fact that would be occupied by a lubricating oil film, as will be shown, and will introduce no backlash.

Since it is contemplated that the teeth are to be lubricated by oil, and since if the teeth were cut as above described, the clearance at all teeth and in all positions is less than the thickness of an oil film, the hob must now be set to cut still deeper to provide clearance enough for oil film to form and be maintained on the teeth.

In the foregoing for description purposes, and as stated, the teeth 12 on the inner gear 13 were considered as they would be if cut so as to be in actual contact all around the gear at the dihedral edges 62—65 (Figs. 5 to 8) in the non-tipped position of the inner gear; and then considered as further cut to provide relief for the sake of the intermediate positions (between A and D etc); and then further cut to provide oil film clearance. In practice, of course, all of this cutting would be done at one operation with a single depth setting of the hob.

When the inner gear is tipped through the maximum angle, corresponding to the maximum shaft misalignment angle, that may be encountered, the gears drive at the teeth that are in said intermediate positions, between A and C etc., because the clearance is then the least at those positions.

For smaller and smaller angles of misalignment and less and less tipping of the inner gear, the position around the gear at which driving occurs, spreads over more and more teeth both clockwise and counterclockwise from said position, taking in more and more teeth until at zero tipping angle, it extends all the way around the gear and driving occurs on all of the teeth and the clearance is then at the maximum.

Just how little the aforesaid clearance is, including that necessary to prevent binding at the said intermediate positions plus enough to provide room for oil, can be ascertained from the following deductions; which also provide data for making a coupling free from back-lash or binding as contemplated by the invention.

To design and make a coupling embodying the invention and having the above described advantages, certain assumptions will be made as follows.

Assume that the maximum shaft misalignment angle to be encountered will be 3°.

The maximum tipping angle of the inner gear and the maximum twist angle of the inner gear tooth as in Fig. 10 will then be 3°.

The tendency to bind at the four intermediate positions between A and D (D and B etc.) and for which relief is provided, will be greater for small pressure angles of the inner gear teeth than for large, and, corresponding to spur gear tooth practice the pressure angle may be in the range from 14° to 30° and will be assumed here to be 25°.

The said tendency to bind will also be greater for large inner gear diameters than for small diameters and a gear of 4" diameter will be assumed, the diameter being taken at a point on the gear teeth corresponding to the pitch diameter of ordinary spur gear teeth and at, say, the middle of the teeth radially considered.

Let $G$ equal the intermediate point for example the point between A and D, Fig. 9, at which maximum interference and binding tends to occur, when the gear tips the maximum due to misalignment angle, $G$ being measured in degrees of angle from the position A.

Let $H$ equal the maximum shaft misalignment angle to be encountered; and it therefore also represents the maximum angle of twist of the gear tooth as in Fig. 10.

Let $I$ equal the pressure angle of the inner gear teeth.

Let $X$ equal the amount of metal in inches that must be removed from the side of the tooth to prevent binding at the point $G$ at maximum tipping of the gear.

Let $PD$ equal the pitch diameter of the gear.

Let $Y$ be a constant equal to the cotangent of the pressure angle and having values as follows.

For pressure angle:

14½°, $Y$ equals 3.86
20°, $Y$ equals 2.74
25°, $Y$ equals 2.14
30°, $Y$ equals 1.74

Let $F$ equal the cone angle at which the teeth are to be cut.

From the foregoing the following can be shown.

$$G \text{ equals } \frac{90°+I}{2}$$

$$X \text{ equals } \{[\cos G - (\cos G \cdot \cos H)] \times \sin (G-I)\} \times PD$$

$$F \text{ equals } H \times Y$$

Solving for G, F and X in an assumed case of pressure angle I equal to 25; Y equal to 2.14; H equal to 3°; and PD equal to 4":

$G$ equals 57.5°
$F$ equals 6.42°
$X$ equals .0017"

The clearance will be maximum at .0017" in the non-tipped position of the inner gear at 0° misalignment; and the clearance will be zero at the 57.5° position G between A and D for maximum misalignment of 3°, and hence at this point enough clearance must be added to contain oil film for lubrication, say .002". This added oil film clearance will also appear as added to the clearance of .0017" for no-angle of misalignment conditions; making the maximum clearance at any condition .0037".

This small clearance, filled as it is with lubricant oil is too small to cause any back-lash lost motion even at the maximum clearance condition of no misalignment angle, and is of course, as shown, even less at all misalignment angles, down to .002 at maximum misalignment angle. It is to be noted that in ordinary spur gear practice a clearance between teeth of .004" or even greater is provided, and will contain lubricant, and introduce no objectionable back-lash; and therefore of course the clearance of .0037" will introduce no objectionable back-lash in the present invention.

As stated hereinbefore perhaps the most fully developed coupling of this general class proposed heretofore is one in which an inner gear has teeth cut like the teeth of a spherical spur gear; and the improvement of the instant invention over such prior couplings will here be explained in connection with Fig. 19, 18, 20 and 21, which in the order named, corresponds respectively to Figs. 5, 6, 8 and 10 above discussed.

In cutting teeth 70 on the spherical gear 71, the hob travels on a circle (instead of along two rectilinear lines at an angle, such as lines 56—57, Fig. 4). The faces of the tooth 70 will therefore be convexly curved as at 72—73 in Figs. 18 and 20. If the teeth 70 are cut of such thickness, that when the inner gear is in the aforesaid non-tipped position, Fig. 19, and the tooth 70 in the tooth space 76 of the outer gear is without twist, and so that there will be little or no clearance or back-lash, the tooth 70 will be substantially in contact with the outer gear tooth faces at points 77—78, Fig. 20, which correspond to points 66—67 of Fig. 8.

In the present invention when the inner gear became tipped and the tooth twisted in position as described, the conditions at the inner gear tooth changed from Fig. 8 to Fig. 10. With the spherical gear tooth, that would correspond to going from Fig. 20 to Fig. 21. But as will be seen in Fig. 21, this would be impossible because of the convexity of the tooth faces 72—73.

Figure 20:
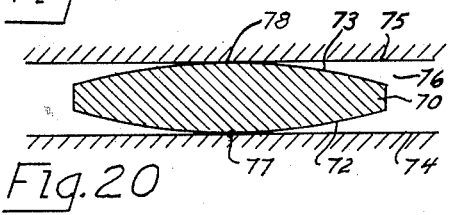
Figure 21:
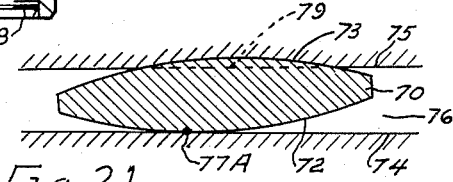

Assuming that the tooth face 72 remains in contact with the outer gear tooth face 74, the tooth in effect rocks on the face 74 and the point of contact 77, Fig. 20, shifts to 77A in Fig. 21, and the other face 73 of the tooth would have to overlap into the metal behind the tooth face, 75, as indicated by the dotted line 79, and this is impossible.

Thus, if the tooth 70 fits the tooth space 76 without back-lash before gear tipping, the inner gear cannot tip at all to allow for shaft misalignment as explained hereinbefore.

Figure 22:
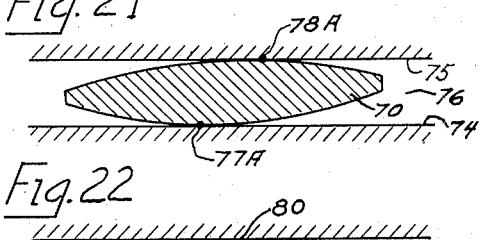

In order to allow it to tip, and to allow the tooth to twist, the tooth 70 must be cut thinner, for example as in Fig. 22, where as shown it will all be within the tooth space 76.

Figure 23:
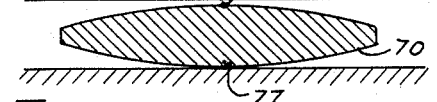

Now even if the tooth is cut as thick as possible so as to be in actual contact at points 77A and 78A as in Fig. 22, to eliminate back-lash at maximum shaft misalignment and maximum gear tip and tooth twist, then for smaller angles of shaft misalignment and little tooth twist as in Fig. 23, the thinness of the tooth 70 introduces a large clearance as at 80 with attendant lost motion and back-lash.

Thus with the spherical inner gear, the coupling can only be designed for a very limited range of shaft angle displacement without lost motion and back-lash.

The coupling of Fig. 1 is what may be called a double form, the outer gear element or sleeve 17 being supported by and floating on the meshed engagement of two sets of teeth 18 and 19 with the teeth 12 and 15 of two inner gear elements 13 and 16 one on each of the shafts 1 and 2 to be coupled.

Figure 13:
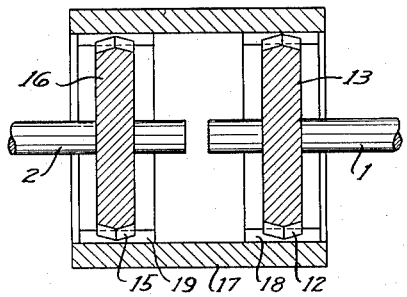
Figs. 13, 14, 15 and 16 are views illustrating the form of Fig. 1 diagrammatically and showing the positions taken up by parts thereof under different conditions of shaft misalignment.

In Fig. 13, this coupling is shown diagrammatically when the two shafts 1 and 2 are substantially in axial alignment.

Figure 15:
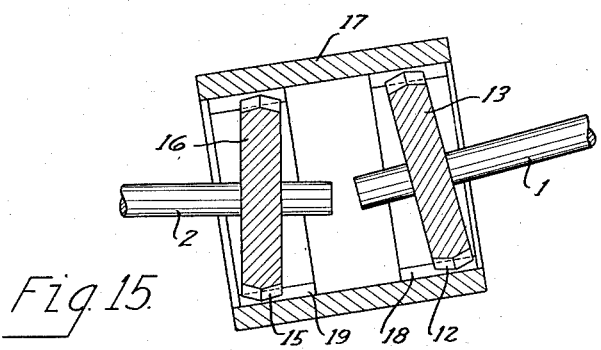

In Fig. 15, the shafts 1 and 2 are displaced at an angle to each other and the outer sleeve 17 takes up an angular position, and part of the angle of shaft misalignment appears in the tipped angle of gear 13 and part of it in gear 16.

Figure 14:
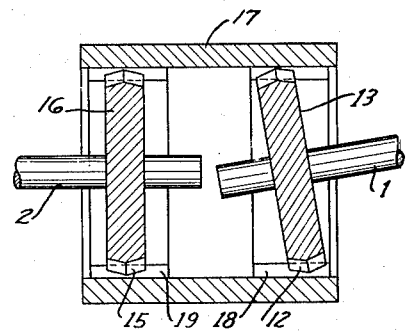

In Fig. 14, one shaft 2, is at an angle to the other shaft 1, and displaced laterally with respect to it, so that all of the tipping angle is at the gear 13; and this case illustrates the importance of having no back-lash in the non-tipped condition of the inner gear 16, as well as in the tipped condition of the gear 13.

Figure 16:
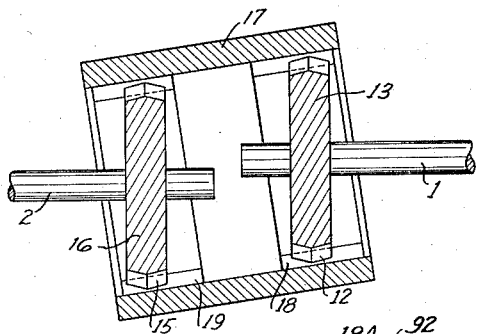

Fig. 16 illustrates the conditions when the two shafts, 1 and 2 are parallel but offset laterally, one from the other. Both gears 13 and 16 are tipped with respect to the outer gear 17.

Figure 12:
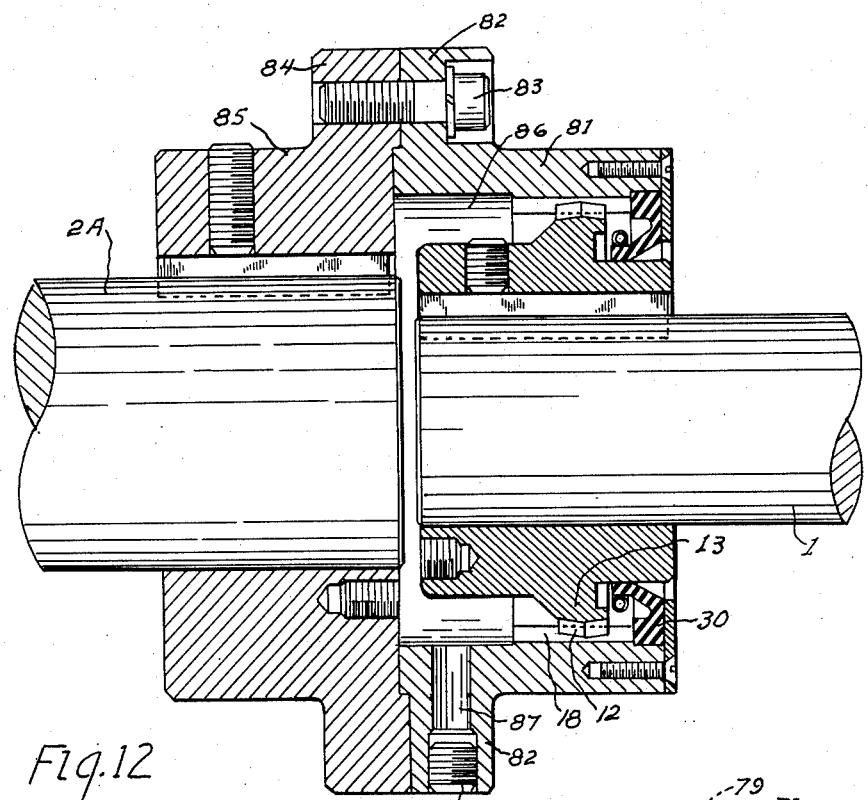
Fig. 12 is a view similar to Fig. 1 illustrating another embodiment of the invention.
Figure 18:
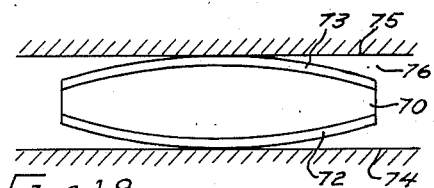
Figs. 18 to 23 are views similar to Figs. 5, 6, 8 and 10 but illustrating teeth of the prior art; and, Fig. 24 is a view similar to Fig. 4 illustrating a modification of the invention hereof.
Figure 19:
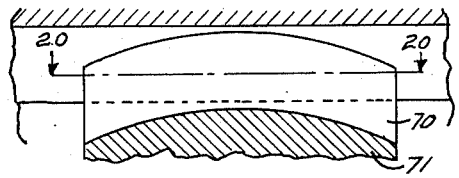

In Fig. 12 is illustrated a coupling in what might be called a single form. An inner gear 13 having teeth 12 is mounted on a shaft 1 and sealed by a seal 30, substantially of the same construction as in Fig. 1. The outer gear teeth 18 are here on a sleeve 81 having a flange 82 by which it is secured by screws 83 to a flange 84 on a hub 85 mounted on the other shaft, here 2A. An oil chamber 86 is provided within the sleeve 81 and supplied through a duct 87 closed by a plug 88.

The coupling of Fig. 12, as will be apparent, may be used with the shafts 1 and 2A in the cases illustrated in Figs. 13 and 14 for the shafts 1 and 2.

Figure 17:
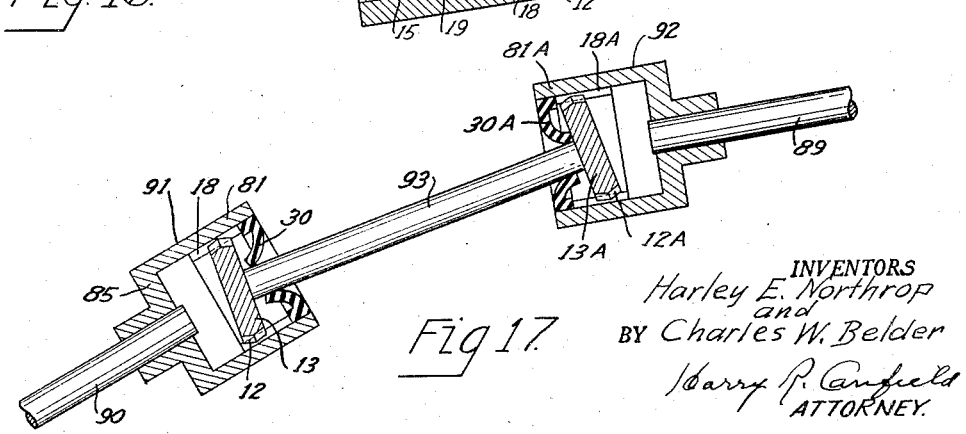
Fig. 17 is a diagrammatic view illustrating another embodiment of the invention.

In Fig. 17, is shown diagrammatically an arrangement using the coupling of Fig. 12 as a universal joint construction in the line of two shaft 89 and 90, offset laterally and at an angle to each other.

In Fig. 17, a coupling 91 is provided which may be like the coupling of Fig. 12, the outer gear teeth 18 being on a sleeve 81 connected to a hub 85 on the shaft 90; and having an inner gear 13 with teeth 12 meshed with the teeth 18.

A similar or like coupling 92 is mounted on the shaft 89, identified by the same part numbers with the suffix A.

The two inner gears 13 and 13A are connected together by a shaft 93.

The couplings are lubricated as described for Fig. 12 and sealed by seals 30–30A which may be the same as hereinbefore described.

A universal joint of this construction has the advantage that lubricant is not thrown out of it by centrifugal force as in the case of many prior joints, but is maintained thereby in an annular ring at the engaged gear teeth submerging them at all times.

It is believed that it will be apparent that the arrangement of Fig. 17 may be used with shafts that are parallel but offset from each other; or, at an angle to each other and not offset.

To simplify the description of the process of Fig. 4, the blank 46 was described as having its periphery pre-cut to the cone angle. This is not an essential step of the process. It is preferable for the periphery to be cut at some angle or rounded at each side of the medial plane in order that the tip surfaces of the teeth 94—95 (see Figs. 5 and 11) will not bottom in the outer gear tooth spaces when maximum tip of the inner gear occurs, as they might as indicated in broken line at 95A, Fig. 11, if for example the blank periphery had been cylindrical.

In the process of Fig. 4 as will now be apparent, the helical hob 55 may be moved to approach the blank 46 along the line 56 while another hob 55A is approaching the blank along the line 57 at the same time but at a different point around the blank.

Or the hob 55 after approaching the blank and cutting along the line 56 may be changed in direction and moved along the line 57 continuing to cut and finally leave the blank.

It is believed that, from the foregoing, it will be clear that a part of the invention of primary importance resides in providing teeth on the inner gear of such form that a tooth may fit in a tooth space of the outer gear with no more clearance therewith than is necessary for an oil film, in ordinary gear practice, when the inner gear is not tipped, and there is no shaft misalignment; and at the same time when the inner gear is tipped by shaft misalignment will allow the inner gear teeth to twist in the outer tooth spaces without binding.

Such teeth can be made most conveniently and efficiently by generating them as involute teeth with a helical hob and feeding the hob so that the cut teeth conform generally to the surfaces of two opposing cones whose common base is at the medial plane of the gear and whose apices are in the axis of the gear, and for that reason the described process and the resulting gear are preferred.

In any of the above mentioned methods of cutting the teeth, for example and with reference to Fig. 4 it will, of course, be understood that the hob 55 may be fed in either direction along the line 56, that is, either toward or from the medial plane of the blank, the choice being determined by factors of design of the machine driving and feeding the hob.

In Fig. 4, when considered as illustrating the movement of a hob along the rectilinear lines 56 and 57, these paths of movement meet at a point 106, at which the lines of movement intersect.

However, in some cases, having in mind the design of a machine to drive and directionally feed the hob, it may be found advantageous to go from the direction 56 to the direction 57 (or vice versa) with a curved movement. This is illustrated in Fig. 24. The path of movement 56 proceeds rectilinearly to a point 107 and continues into the path 57 at a point 108 and between the points 107 and 108 the path is curved, preferably circular, as at 109.

When this process is used, the dihedral angle corner or edge will not be a sharply designed edge, as in Fig. 5 at 62 for example, but will be a slightly rounded dihedral corner, or small area 62A as in Fig. 24, departing from a sharp dihedral corner by a few ten thousandths of an inch; but for all practical purposes and as defined here, it is a dihedral edge. Any clearance that might be introduced thereby may be negligibly small, and in any event is obviated by setting the hob to cut slightly less deep.

The above tooth cutting processes have been referred to the medial plane of the blank 46. It is not a necessary limitation that the medial plane be exactly midway between the faces of the blank or exactly midway between the opposite ends of the teeth; nor that it be exactly at right angles to the axis of the blank considered as circular; nor that the apex of the cone be exactly in the axis of the blank; as it is believed will be understood.

While it is preferred to cut the teeth on the inner gears by a tooth generating helical hob as described, it is believed that it will be apparent that they may be cut with a circular, disc-like, toothed milling cutter having suitably formed teeth, and fed across the blank along the cone-angle lines 56 and 57 of Fig. 4, without concurrently rotating the blank, and that those skilled in the gear cutting art will know how to do this without further illustration or description.

In cutting the teeth on the inner gear as described for the preferred process, the lines of direction of the cutting are in a plane at right angles to the medial plane of the blank. This makes the teeth correspond in general to spur gear teeth. It is within the scope of the invention to make the direction of cutting in a plane at an angle to the medial plane, which would make the teeth in general correspond to helical gear teeth. It is believed that this will be understood without further illustration or description.

In such case the teeth would still be properly described as conforming in general to the surfaces of cones, whose apices are at opposite sides of the blank.

In all cases, it is a characteristic of the teeth of the inner gear, that the bottoms of the tooth spaces between the teeth in the preferred practice are caused to lie substantially on the surfaces of two opposite cones, having apices at opposite sides of the gear, by correspondingly feeding the cutter or cutters, but the advantages of the invention will not be lost if the direction of feed is not strictly rectilinear as described. Also, while the teeth of the outer gear are described as preferably rectilinear and parallel to its axis, it will be apparent that the advantages of the invention will not be lost if some curvature is given to these teeth, concave or convex with respect to the axis thereof.

This application is a continuation of application Serial No. 192,954 filed October 30, 1950.

We claim:

1. A flexible coupling for coupling a pair of rotary shafts, comprising an outer gear element having a circular series of inwardly extending teeth, and an inner gear element comprising a disc-like body portion having a like circular series of outwardly extending teeth on its periphery; the gear elements positionable with the outer gear element surrounding the inner gear element, and with the teeth of the gear elements in mutually meshed engagement; means by which one shaft may drive the other through the tooth engagement, comprising connecting parts between the respective gear elements and shafts to cause them to rotate respectively with the shafts; the teeth of the gear elements constructed so that the drive will occur without back-lash and without binding at the tooth engagement, when the rotational axes of the gear elements, due to the positions of the shafts, are at any angle of axial misalignment, with each other in the range from zero degrees to a chosen preselected maximum; the tooth construction of the outer gear element comprising teeth that extend substantially rectilinearly parallel to its axis; the tooth construction of the inner gear element comprising tooth spaces between adjacent teeth having bottom surfaces disposed to define the side surfaces of two geometrical cones having a common base in a plane of the body portion between its sides, and having cone apices in the axis of the body portion spaced from the opposite sides thereof; and the teeth being involute teeth, and having a known pressure angle; and the teeth being of greatest thickness at a portion thereof in the plane of the common cone base, and tapering therefrom in opposite directions toward the sides of the body portion; and the angle of each cone between its axis and a side thereof being equal to the said preselected maximum angle of misalignment, multiplied by the value of the cotangent of the said known pressure angle.

2. A flexible coupling for coupling a pair of rotary shafts, comprising an outer gear element having a circular series of inwardly extending teeth, and an inner gear element comprising a disc-like body portion having a like circular series of outwardly extending teeth on its periphery; the gear elements positionable with the outer gear element surrounding the inner gear element, and with the teeth of the gear elements in mutually meshed engagement; means by which one shaft may drive the other through the tooth engagement comprising hub parts on the respective gear elements by which they may be connected respectively to the shafts, to rotate therewith; the teeth of the gear elements constructed so that the drive will occur without back-lash and without binding at the tooth engagement when the rotational axes of the shafts are at an angle of misalignment with each other, in the range from zero degrees to a chosen preselected maximum; the tooth construction of the outer gear element comprising teeth that extend substantially rectilinearly parallel to the axis of the shaft to which it is connected; the tooth construction of the inner gear element comprising tooth spaces between adjacent teeth having bottom surfaces disposed to define the side surfaces of two geometrical cones having a common base in a plane of the body portion between its sides, and having cone apices in the axis of the body portion spaced from the opposite sides thereof; and the teeth being involute teeth, and having a known pressure angle; and the teeth being of greatest thickness at a portion thereof in the plane of the common cone base, and tapering therefrom in opposite directions toward the sides of the body portion; and the angle of each cone between its axis and a side thereof being equal to the said preselected maximum angle of misalignment, multiplied by the value of the cotangent of the said known pressure angle.

3. A flexible coupling for coupling a pair of rotary shafts, comprising a pair of inner gear elements each comprising a disc-like body portion having a circular series of outwardly extending teeth on its periphery; and having hub portions by which they may be connected respectively to adjacent confronting end portions of the shafts and rotate therewith and be adjacent to each other; an outer gear element having a circular series of inwardly extending teeth and formed to surround both inner gear elements with the teeth of the outer gear element in mutually meshed engagement with the teeth of both inner gear elements, and to be supported by the tooth engagement; whereby one shaft may drive the other through the tooth engagement; the teeth of the gear elements constructed so that the drive will occur without back-lash and without binding at the tooth engagement when, due to the positions of the shafts, the axis of either inner gear element is at an angle of misalignment with the axis of the outer gear element in the range from zero degrees to a chosen preselected maximum; the tooth construction of the outer gear element comprising teeth that extend substantially rectilinearly parallel to the axis of the circular series of teeth thereon; the tooth construction of each of the inner gear elements comprising tooth spaces between adjacent teeth having bottom surfaces disposed to define the side surfaces of two geometrical cones having a common base in a plane of the body portion between its sides, and having cone apices in the axis of the body portion spaced from the opposite sides thereof; and the teeth being involute teeth, and having a known pressure angle; and the teeth being of greatest thickness at a portion thereof in the plane of the common cone base, and tapering therefrom in opposite directions toward the sides of the body portions; and the angle of each cone between its axis and a side thereof being equal to the said preselected maximum angle of misalignment, multiplied by the value of the cotangent of the said known pressure angle.

4. A flexible coupling for coupling a pair of rotary elements, comprising a circular inner gear element having outwardly extending teeth; a circular outer gear element having inwardly extending teeth; the two gear elements positionable with the outer gear element surrounding the inner gear element and with the teeth of the gear elements in mutually meshed engagement; means by which one rotary element may drive the other through the tooth engagement comprising connecting parts between the respective gear elements and rotary elements to cause them to rotate respectively with the rotary elements; the teeth of the gear elements being formed so that the drive will occur without back-lash or binding at the tooth engagement when the rotational axes of the gear elements, due to the positions of the rotary elements, are at an angle of misalignment with each other in the range from zero degrees to a preselected maximum; the tooth form of the outer gear element being such that the teeth extend longitudinally in the direction of the gear axis; the tooth form of the inner gear element being such that each tooth has portions extending outwardly at right angles to the surface of a geometrical cone coaxial with the inner gear element.

5. A flexible coupling for coupling a pair of rotary elements, comprising a circular inner gear element having outwardly extending teeth; a circular outer gear element having inwardly extending teeth; the two gear elements positionable with the outer gear element surrounding the inner gear element and with the teeth of the gear elements in mutually meshed engagement; means by which the one rotary element may drive the other through the tooth engagement comprising connecting parts between the respective gear elements and rotary elements to cause them to rotate respectively with the rotary elements; the teeth of the gear elements bing formed so that the drive will occur without back-lash or binding at the tooth engagement when the rotational axes of the gear elements, due to the positions of the rotary elements, are at an angle of misalignment with each other in the range from zero degrees to a preselected maximum; the tooth form of the outer gear element being such that the teeth extend longitudinally in the direction of the gear axis; the tooth form of the inner gear element being such that each tooth has portions extending outwardly at right angles to the surface of a geometrical cone coaxial with the inner gear element, and, considered as an ordinary gear tooth, has a known pressure angle, and the cone angle between the cone surface and its axis is equal to the said maximum angle of misalignment multiplied by the value of the cotangent of the pressure angle.

6. A flexible coupling for coupling a pair of rotary elements, comprising a circular inner gear element having outwardly extending teeth; a circular outer gear element having inwardly extending teeth; the two gear elements positionable with the outer gear element surrounding the inner gear element and with the teeth of the gear elements in mutually meshed engagement; means by which one rotary element may drive the other through the tooth engagement comprising hub parts on the respective gear elements by which they may be connected respectively to the rotary elements to rotate therewith; the teeth of the gear elemens being formed so that the drive will occur without back-lash or binding at the tooth engagement when the rotational axes of the gear elements, due to the positions of the rotary elements, are at an angle of misalignment with each other in the range from zero degrees to a preselected maximum; the tooth form of the outer gear element being such that the teeth extend longitudinally in the direction of the gear axis; the tooth form of the inner gear element being such that each tooth has portions extending outwardly at right angles to the surface of a geometrical cone coaxial with the inner gear element.

7. A flexible coupling for coupling a pair of rotary elements, comprising a circular inner gear element having outwardly extending teeth; a circular outer gear element having inwardly extending teeth; the two gear elements positionable with the outer gear element surrounding the inner gear element and with the teeth of the gear elements in mutually meshed engagement; means by which one rotary element may drive the other through the tooth engagement comprising hub parts on the respective gear elements by which they may be connected respectively to the rotary elements to rotate therewith; the teeth of the gear elements being formed so that the drive will occur without back-lash or binding at the tooth engagement when the rotational axes of the gear elements, due to the positions of the rotary elements, are at an angle of misalignment with each other in the range from zero degrees to a preselected maximum; the tooth form of the outer gear element being such that the teeth extend longitudinally in the direction of the gear axis; the tooth form of the inner gear element being such that each tooth has portions extending outwardly at right angles to the surface of a geometrical cone coaxial with the inner gear element, and, considered as an ordinary gear tooth, has a known pressure angle, and the cone angle between the cone surface and its axis is equal to the said maximum angle of misalignment multiplied by the value of the cotangent of the pressure angle.

8. A flexible coupling for coupling a pair of rotary elements, comprising a pair of inner gear elements each having outwardly extending teeth; an outer circular gear element having inwardly extending teeth and formed to surround both inner gear elements with the teeth of the outer gear element in mutually meshed engagement with the teeth of both inner gear elements, and to be supported by the tooth engagement; means by which one rotary element may drive the other through the tooth engagement comprising hub parts on the respective inner gear elements by which they may be connected respectively to the rotary elements to rotate therewith; the teeth of the gear elements being formed so that the drive will occur without back-lash or binding at the tooth engagement when the rotational axis of either of the inner gear elements, due to the positions of the rotary elements, is at an angle of misalignment with the axis of the outer gear element in the range from zero degrees to a preselected maximum; the tooth form of the outer gear element being such that the teeth extend longitudinally in the direction of the gear axis; the tooth form of the inner gear elements being such that each tooth has portions extending outwardly at right angles to the surface of a cone coaxial with the inner gear element.

9. A flexible coupling for coupling a pair of rotary elements, comprising a pair of inner gear elements each having outwardly extending teeth; an outer circular gear element having inwardly extending teeth and formed to surround both inner gear elements with the teeth of the outer gear element in mutually meshed engagement with the teeth of both inner gear elements, and to be supported by the tooth engagement; means by which one rotary element may drive the other through the tooth engagement comprising hub parts on the respective inner gear elements by which they may be connected respectively to the rotary elements to rotate therewith; the teeth of the gear elements being formed so that the drive will occur without back-lash or binding at the tooth engagement when the rotational axis of either of the inner elements, due to the positions of the rotary elements, is at an angle of misalignment with the axis of the outer gear element, in the range from zero degrees to a preselected maximum; the tooth form of the inner gear elements being such that each tooth has portions extending outwardly at right angles to the surface of a cone coaxial with the inner gear element; and, considered as an ordinary gear tooth, has a known pressure angle, and the cone angle between the cone surface and its axis is equal to the said maximum angle of misalignment multiplied by the value of the cotangent of the pressure angle.

10. A flexible coupling comprising an outer gear element having a plurality of inwardly extending teeth, and an inner gear element having a disc-like body portion with a like plurality of outwardly extending teeth; the gear elements telescoped together with their teeth mutually meshed and constructed to be drivingly connected respectively with a pair of rotary shafts; the gear elements having each a construction such that one shaft may rotatively drive the other through meshed tooth engagement without back-lash and without binding at the tooth engagement when the shaft axes are at any angle of misalignment with each other in the range from zero degrees to a chosen preselected maximum angle; the construction of the outer gear element comprising teeth and tooth spaces that extend substantially rectilinearly parallel to the axis of the shaft with which it is connected; the construction of the inner gear element comprising tooth spaces having bottom surfaces disposed to define the surfaces of two geometrical cones having a common base substantially in a plane of the body portion between the sides thereof and having apices substantially in the axis of the body portion and spaced from the opposite sides thereof; and each tooth being an involute tooth and having a known pressure angle; and each tooth being of greatest thickness at a portion in the plane of the common cone base and tapering therefrom in opposite directions toward the sides of the body portion; and the angle of said cone between its axis and a side thereof being equal to the said preselected maximum angle of shaft misalignment multiplied by the value of the cotangent of the said known pressure angle.

11. A flexible coupling comprising an outer gear element having a plurality of inwardly extending teeth, and an inner gear element having a disc-like body portion with a like plurality of outwardly extending teeth; the gear elements telescoped together with their teeth mutually meshed and constructed to be drivingly connected respectively with a pair of rotary shafts; the gear elements having each a construction such that one shaft may rotatively drive the other through meshed tooth engagement without back-lash and without binding at the tooth engagement when the shaft axes are at any angle of misalignment with each other in the range from zero degrees to a chosen preselected maximum angle; the construction of the outer gear element comprising teeth and tooth spaces that extend substantially rectilinearly parallel to the axis of the shaft with which it is connected; the construction of the inner gear element comprising tooth spaces having bottom surfaces disposed to define the surfaces of two geometrical cones having a common base substantially in a plane of the body portion between the sides thereof and having apices substantially in the axis of the body portion and spaced from the opposite sides thereof; and each tooth having convexly curved outwardly extending faces having a known pressure angle; and each tooth being of greatest thickness at a portion in the plane of the common cone base and tapering therefrom in opposite directions toward the sides of the body portion; and the angle of said cone between its axis and a side thereof being equal to the said preselected maximum angle of shaft misalignment multiplied by the value of the cotangent of the said known pressure angle.

References Cited in the file of this patent

UNITED STATES PATENTS

| | | |
|---|---|---|
| 2,303,813 | Barcus | Dec. 1, 1942 |
| 2,496,702 | Dykman et al. | Feb. 7, 1950 |
| 2,682,760 | Shenk | July 6, 1954 |